United States Patent
Obitko et al.

(10) Patent No.: US 10,339,164 B2
(45) Date of Patent: Jul. 2, 2019

(54) DATA EXCHANGE IN A COLLABORATIVE ENVIRONMENT

(71) Applicant: Rockwell Automation Technologies, Inc., Mayfield Heights, OH (US)

(72) Inventors: Marek Obitko, Kladno (CR); Robert Mavrov, Prague (CR); Vaclav Jirkovsky, Prague (CR); Danny L. Carnahan, Hudson, OH (US); Leopoldo Paredes, Pembroke Pines, FL (US); Haithem Mansouri, Patchogue, NY (US); Michael Kalan, Highland Heights, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 244 days.

(21) Appl. No.: 15/273,372

(22) Filed: Sep. 22, 2016

(65) Prior Publication Data
US 2018/0081962 A1 Mar. 22, 2018

(51) Int. Cl.
*G06F 16/31* (2019.01)
*G06F 9/54* (2006.01)
(Continued)

(52) U.S. Cl.
CPC .............. *G06F 16/31* (2019.01); *G06F 9/541* (2013.01); *G06F 16/214* (2019.01); *G06F 16/27* (2019.01); *G06F 16/3344* (2019.01)

(58) Field of Classification Search
None
See application file for complete search history.

(56) References Cited

U.S. PATENT DOCUMENTS

| 7,046,691 | B1 * | 5/2006 | Kadyk | H04L 12/66 370/466 |
| 7,680,800 | B2 * | 3/2010 | Claussen | G06F 17/2247 707/809 |

(Continued)

FOREIGN PATENT DOCUMENTS

WO    WO-2016171662 A1 * 10/2016 ........... G05B 19/418

OTHER PUBLICATIONS

W3C, OWL 2 Web Ontology Language XML Serialization [online], W3C, Dec. 3, 2009 [retrieved on Jun. 21, 2018]. Retrieved from the Internet: <URL: https://www.w3.org/TR/owl2-xml-serialization/> (Year: 2009).*

(Continued)

*Primary Examiner* — Amresh Singh
(74) *Attorney, Agent, or Firm* — Kunzler Bean & Adamson; Bruce R. Needham

(57) ABSTRACT

An apparatus, system, method, and program product are disclosed for data exchange in a collaborative environment. A data module receives first data from a first application that corresponds to second data of a second application. The first data has a structured format readable by the first application, but not readable by the second application. The structured format includes a semantic language format. A conversion module converts the first data from the semantic language format to an intermediate data having a format readable by the second application. A synchronization module synchronizes the intermediate data with the second data such that changes made to the first data by the first application are replicated in the second data of the second application.

19 Claims, 6 Drawing Sheets

(51) Int. Cl.
*G06F 16/33* (2019.01)
*G06F 16/27* (2019.01)
*G06F 16/21* (2019.01)

(56) References Cited

U.S. PATENT DOCUMENTS

| | | | |
|---|---|---|---|
| 8,949,292 B2* | 2/2015 | Chao | G06F 17/5009 |
| | | | 707/810 |
| 2005/0108215 A1* | 5/2005 | Thomas | G06T 15/005 |
| 2006/0005126 A1* | 1/2006 | Shapiro | G06F 17/2247 |
| | | | 715/248 |
| 2014/0229335 A1* | 8/2014 | Chen | G06Q 10/02 |
| | | | 705/26.61 |
| 2016/0004767 A1* | 1/2016 | Song | G06F 17/30861 |
| | | | 707/769 |
| 2016/0171068 A1* | 6/2016 | Hardin | G06F 11/1415 |
| | | | 707/610 |

OTHER PUBLICATIONS

Application No. 17186758.3, European Search Report dated Jan. 31, 2018.
David S. Linthicum, "Enterprise Application Integration", released Nov. 1999, https://www.safaribooksonline.com/library/view/enterprise-application-integration/0201615835/ch18.html, Last visited Apr. 8, 2018.
Wikipedia, Linked Data, https://en.wikipedia.org/wiki/Linked_data, Last visited Jun. 24, 2016.

* cited by examiner

DATA EXCHANGE IN A COLLABORATIVE ENVIRONMENT

FIELD

The subject matter disclosed herein relates to collaborative engineering and more particularly relates to exchanging and formatting data among various applications in a collaborative engineering environment.

BACKGROUND INFORMATION

Collaborative engineering is a process of engineering collaboratively, together by multiple individuals, typically using multiple tools that each have a different focus or purpose. During collaborative engineering processes, various data sets may be exchanged between the various tools that are used, which may eliminate data redundancy, but may also cause shared data to get out of sync.

BRIEF DESCRIPTION

An apparatus for data exchange in a collaborative environment is disclosed. A system and method also perform the functions of the apparatus. The apparatus includes a data module that receives first data from a first application that corresponds to second data of a second application. The first data has a structured format readable by the first application, but not readable by the second application. The structured format includes a semantic language format. The apparatus includes a conversion module that converts the first data from the semantic language format to an intermediate data having a format readable by the second application. The apparatus includes a synchronization module that synchronizes the intermediate data with the second data such that changes made to the first data by the first application are replicated in the second data of the second application.

In one embodiment, the data module further receives the second data from the second application. The second data may correspond to first data of the first application. The second data has a format readable by the second application, but not readable by the first application. The conversion module, in some embodiments, also converts the second data from the format readable by the second application to an intermediate data having a semantic language format readable by the first application. The synchronization module, in various embodiments, synchronizes the intermediate data with the first data, where changes made to the second data by the second application are replicated in the first data of the first application.

In one embodiment, the semantic language format readable by the first application includes a data format intended for data transmissions on the world wide web over the Internet. In certain embodiments, the semantic language format is based on a resource description framework ("RDF") and/or a web ontology language ("OWL"). In another embodiment, the conversion module also maps one or more objects of the first data to one or more corresponding objects of the second data to generate the intermediate data.

In various embodiments, the data module exports the first data as one or more files that are formatted according to the semantic language format, and the conversion module reads the one or more files to convert the first data to the intermediate data. In one embodiment, the data module accesses the first data from the first application using one or more application programming interfaces ("APIs") provided by the first application.

In a further embodiment, the apparatus includes a query module that queries the first application for access to at least a portion of the first data formatted in the semantic language format. In another embodiment, the query module uses a semantic query language to define one or more query statements to query the first application for the at least a portion of the first data. In various embodiments, the semantic query language is a SPARQL protocol and RDF query language ("SPARQL"). In another embodiment, the query module queries the first application for access to at least a portion of the first data over a network.

In certain embodiments, the first data and the second data are stored in a central repository that is accessible to the first application and the second application. In a further embodiment, the synchronization module is located at the central repository such that synchronization operations between the first data and the second data are performed on the central repository. In one embodiment, the first data includes an aggregation of data from a plurality of different applications that include plurality of engineering design tools.

A method for data exchange includes receiving first data from a first application that corresponds to second data of a second application. The first data has a structured format readable by the first application, but not readable by the second application. The structured format includes a semantic language format. The method includes converting the first data from the semantic language format to an intermediate data having a format readable by the second application. The method includes synchronizing the intermediate data with the second data such that changes made to the first data by the first application are replicated in the second data of the second application.

In one embodiment, the method includes receiving the second data from the second application. The second data corresponds to first data of the first application. The second data has a format readable by the second application, but not readable by the first application. The method, in some embodiments, includes converting the second data from the format readable by the second application to an intermediate data having a semantic language format readable by the first application. The method, in various embodiments, further includes synchronizing the intermediate data with the first data, wherein changes made to the second data by the second application are replicated in the first data of the first application.

In some embodiments, the semantic language format readable by the first application includes a data format intended for data transmissions on the world wide web over the Internet. The semantic language format may be based on a resource description framework ("RDF") and/or a web ontology language ("OWL"). In one embodiment, the method includes accessing the first data from the first application using one or more application programming interfaces ("APIs") provided by the first application.

In some embodiments, the method further includes querying the first application for access to at least a portion of the first data formatted in the semantic language format. A semantic query language may be used to define one or more query statements to query the first application for the at least a portion of the first data. The semantic query language may include a SPARQL protocol and RDF query language ("SPARQL").

A computer program product, in one embodiment, includes a computer readable storage medium that has program code embodied therein. The program code is readable/executable by a processor to receive first data from a first application that corresponds to second data of a second application. The first data has a structured format readable by the first application, but not readable by the second application. The structured format includes a semantic language format. The program code is readable/executable by a processor to convert the first data from the semantic language format to an intermediate data having a format readable by the second application. The program code is readable/executable by a processor to synchronize the intermediate data with the second data such that changes made to the first data by the first application are replicated in the second data of the second application.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
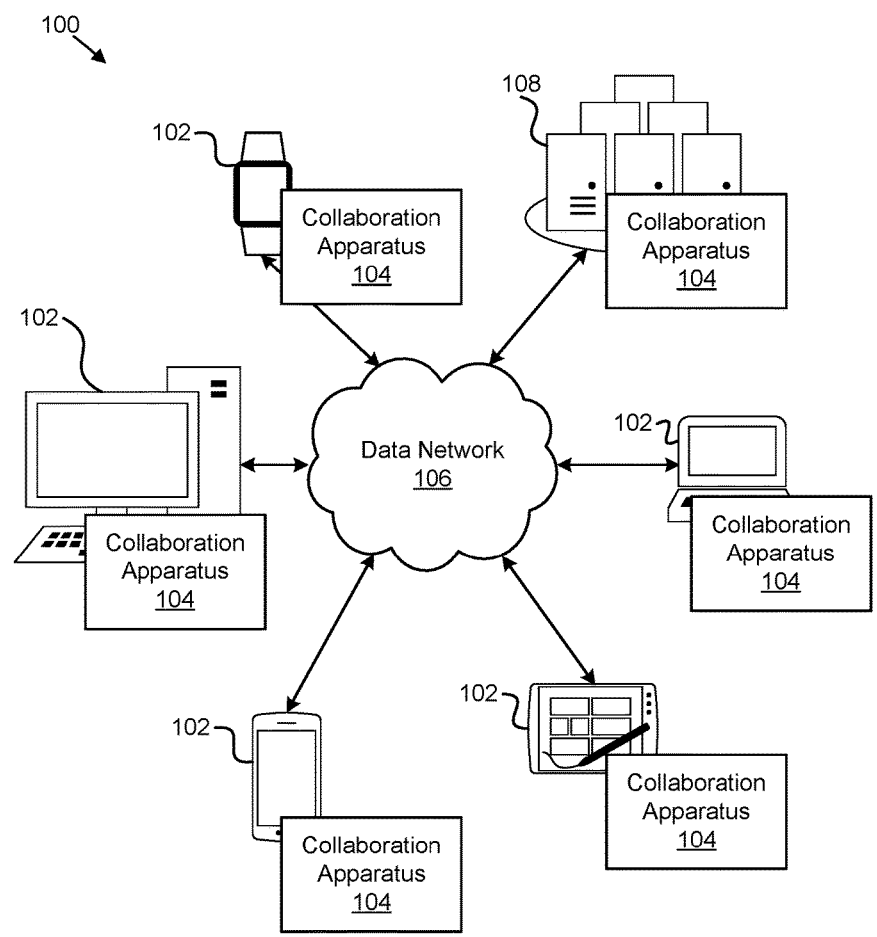
FIG. 1 is a schematic block diagram illustrating one embodiment of a system for data exchange in a collaborative environment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory ("RAM"), a read-only memory ("ROM"), an erasable programmable read-only memory ("EPROM" or Flash memory), a portable compact disc read-only memory ("CD-ROM"), a digital versatile disc ("DVD"), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency ("RF"), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1 is a schematic block diagram illustrating one embodiment of a system 100 for data exchange in a collaborative environment. In one embodiment, the system 100 includes one or more information handling devices 102, one or more collaboration apparatuses 104, one or more data networks 106, and one or more servers 108. Even though a specific number of information handling devices 102, collaboration apparatuses 104, data networks 106, and servers 108 are depicted in FIG. 1, one of skill in the art will recognize, in light of this disclosure, that any number of information handling devices 102, collaboration apparatuses 104, data networks 106, and servers 108 may be included in the system 100 for interrupting a device.

The system 100 includes one or more information handling devices 102. The information handling devices 102 may include a desktop computer, a laptop computer, a tablet computer, a smart phone, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, are configured to execute various programs, program code, applications, instructions, functions, and/or the like, which may access, store, download, upload, and/or the like data located on one or more servers 108. The information handling devices 102 may be electrically coupled to a display (e.g., a touch-enabled display) to present content such as television content, movie content, game content, internet content, or the like.

In one embodiment, the collaboration apparatus 104 is configured to synchronize data between various applications that may have different data formats. For instance, in one embodiment, the collaboration apparatus 104 receives first data from a first application where the first data corresponds to second data of a second application. The first data may have a structured format readable by the first application, but not readable by the second application. The structured format may be a semantic language format. The collaboration apparatus 104 may further convert the first data from the semantic language format to an intermediate data having a format readable by the second application and synchronize the intermediate data with the second data such that changes made to the first data by the first application are replicated in the second data of the second application. The collaboration apparatus 104, including its various sub-modules, may be located on one or more information handling devices 102 in the system 100, one or more servers 108, one or more network devices, and/or the like. The collaboration apparatus 104 is described in more detail below with reference to FIG. 2.

In one embodiment, the collaboration apparatus 104 improves the functionality and/or usability of the computer, the computing technology, the computing environment, or the like, by providing a solution to problems that arise in data sharing, project sharing, or the like, among various collaborators that may use different applications. Each application may have its own scheme for formatting data readable by the application so that the data may not be shareable with other applications that cannot read the data due to its format. For instance, an engineering team may use various engineering applications such as computer-aided design ("CAD") tools, planning tools, integration tools, analysis tools, and/or the like for one or more engineering projects. If one tool makes a change to data associated with the project, the change may need to be propagated to the other tools so that each tool is working on the most up to date data for the project, which may be cumbersome where each project has its own method for formatting data, for exporting/importing data, or the like. The collaboration apparatus 104, however, provides a data formatting solution for keeping data associated with different tools in a collaboration environment synchronized.

By contrast, traditional engineering applications/tools may each be configured with its own components for web and/or desktop presentation, logic (e.g., workflow, process, search, security, collaboration, and/or the like), and/or storage (e.g., individual files, traceability), which may lead to inefficient or unreliable integration, different project or data silos, high cost, low reusability, and/or the like. Creating a scalable and robust collaboration environment that utilizes a plurality of different applications/tools may facilitate rapid deployment, concurrent engineering, problem solving, troubleshooting, dynamic learning, decision making, and/or the like, while also protecting intellectual assets.

From a collaborative engineering development perspective, both in the product design and in production systems, a single collaborative platform for mechanical designs, electrical designs, software designs, and/or the like, including access to engineering bill of materials, manufacturing processes, and engineering requirements, may streamline the overall development process. Moreover, collaborative engineering may prevent engineering design and production issues by importing/exporting design data between various applications/tools that may not normally be compatible with each other.

Furthermore, original equipment manufacturers ("OEMs") may be increasingly expecting suppliers to perform a portion of engineering development work. This may require the suppliers to have stronger process integration, integration of systems and information between the OEMs and the suppliers, a synchronous and/or asynchronous data exchange system, product data management ("PDM") integration, and/or the like.

A collaborative system may involve various parties such as end users, machine manufacturers, and process users.

Collaboration between these parties, in particular the applications/tools that each party uses, may accelerate production and/or design time, may reduce production and/or design costs, may automate certain tasks, may reduce risk, and/or the like. Data may be moved, stored, updated, modified, synchronized, and/or the like between various applications/tools and technology areas, such as mCAD, eCAD, PLM, PDM, P&ID, control systems, manufacturing execution systems, enterprise resource planning, coordinated simulation, process and instrumentation diagrams, engineering efficiency tools, and/or the like. Such a collaborative system may remove the gaps between mechanical, electrical, software, and control systems during design and production by defining a data exchange standard and sustainable custom interfaces, as described herein.

In various embodiments, the collaboration apparatus 104 may be embodied as a hardware appliance that can be installed or deployed on an information handling device 102, on a server 108, or elsewhere on the data network 106. In certain embodiments, the collaboration apparatus 104 may include a hardware device such as a secure hardware dongle or other hardware appliance device (e.g., a set-top box, a network appliance, or the like) that attaches to a device such as a laptop computer, a server 108, a tablet computer, a smart phone, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using a high-definition multimedia interface ("HDMI") port, a DisplayPort port, a Mini DisplayPort port, a video graphics array ("VGA") port, a digital visual interface ("DVI") port, or the like); and/or the like. A hardware appliance of the collaboration apparatus 104 may include a power interface, a wired and/or wireless network interface, a graphical interface that attaches to a display, and/or a semiconductor integrated circuit device as described below, configured to perform the functions described herein with regard to the collaboration apparatus 104.

The collaboration apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the collaboration apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the collaboration apparatus 104.

The semiconductor integrated circuit device or other hardware appliance of the collaboration apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the collaboration apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more servers 108, in one embodiment, may be embodied as blade servers, mainframe servers, tower servers, rack servers, and/or the like. The one or more servers 108 may be configured as a mail server, a web server, an application server, an FTP server, a media server, a data server, a web server, a file server, a virtual server, and/or the like. The one or more servers 108 may be communicatively coupled (e.g., networked) over a data network 106 to one or more information handling devices 102. The one or more servers 108 may store data associated with an information handling device 102, with a user, with one or more applications, and/or the like.

Figure 2:
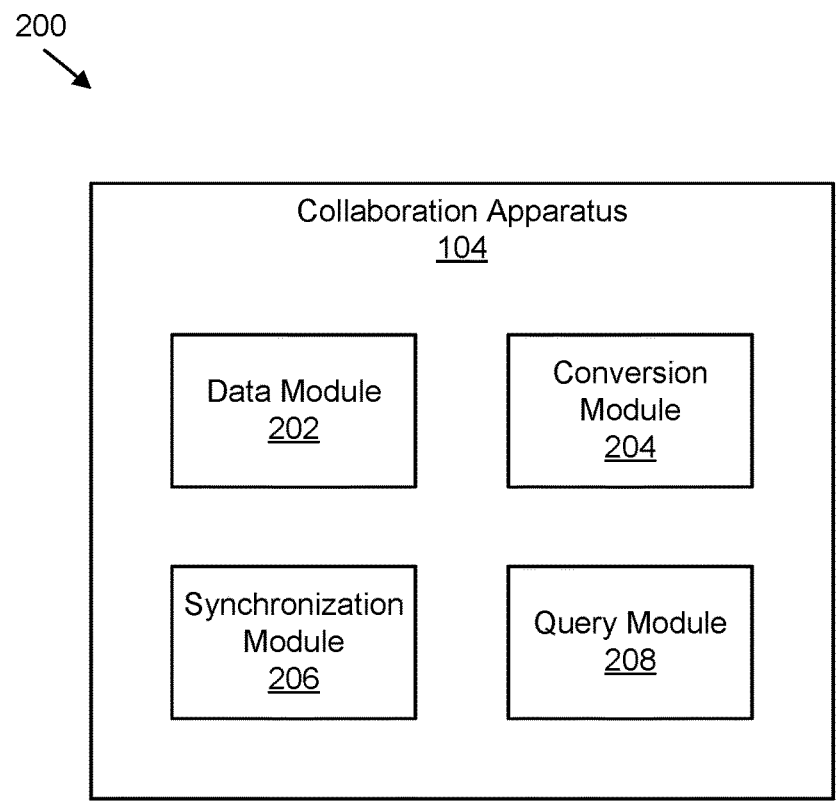
FIG. 2 is a schematic block diagram illustrating one embodiment of an apparatus for data exchange in a collaborative environment.

FIG. 2 is a schematic block diagram illustrating one embodiment of an apparatus 200 for data exchange in a collaborative environment. In one embodiment, the apparatus 200 includes an embodiment of a collaboration apparatus 104. The collaboration apparatus 104, in the embodiment, includes a data module 202, a conversion module 204, a synchronization module 206, and a query module 208, which are described in more detail below.

The data module 202, in one embodiment, receives a first set of data from an application. The first set of data may be data of a project associated with an application, such as a CAD project, a project for a Rockwell Automation® tool, and/or the like. The first set of data may be a formatted set of data used for the project. For example, the first set of data may have an application specific format, such as a format for a particular CAD program.

In another embodiment, the first set of data has a structured or modeled format, such as a semantic language format. As used herein, a semantic language format is a format for data intended to be readable by a machine, and may include various labels, keywords, relationships, descriptions, and/or the like. For example, a semantic language format may include a format, or a combination of formats, designed for data transmissions on the world wide web over the Internet—also known as the "semantic web." In such an embodiment, the semantic language format may be a mark-up or other structured format for data that may be parsed and read based on a schema, dictionary, or the like that defines the structure of the format. Examples of semantic language formats may include the Resource Description Framework ("RDF"), the Web Ontology Language ("OWL"), the Extensible Markup Language ("XML"), the Common Logic ("CL"), and/or the like.

For example, hypertext markup language ("HTML") may describe documents and the links between the documents; RDF, OWL, XML, and/or the like, by contrast, may describe things (e.g., people, meetings, airplane parts, or the like) by adding meaning to content, i.e. describe the structure of the knowledge we have about the content. Based on the semantic language formats, "Linked Data" may be created by interlinking structured data from different sources, which may be queried using semantic queries. One of skill in the art will understand, in light of this disclosure, the basics of linked data, the semantic web, and the various semantic languages used to format data for the semantic web.

However, as described herein, the semantic language formats (e.g., RDF and OWL) may also be used to format and share data from multiple different applications/sources outside of a semantic web-based environment, such as various engineering design applications that each provide data for an engineering project. For example, data expressed in an OWL model may include a list of tags (e.g., a named memory location) that can be used to combine and link data from multiple projects associated with different Rockwell Automation® engineering tools/applications (e.g., Studio 5000®, or the like), different CAD tools, and/or the like. In other words, a single data exchange format (e.g., RDF/OWL) may support a full range of different engineering tools, while at the same time having the capability to work with only a subset of the data from a single tool.

Figure 3:
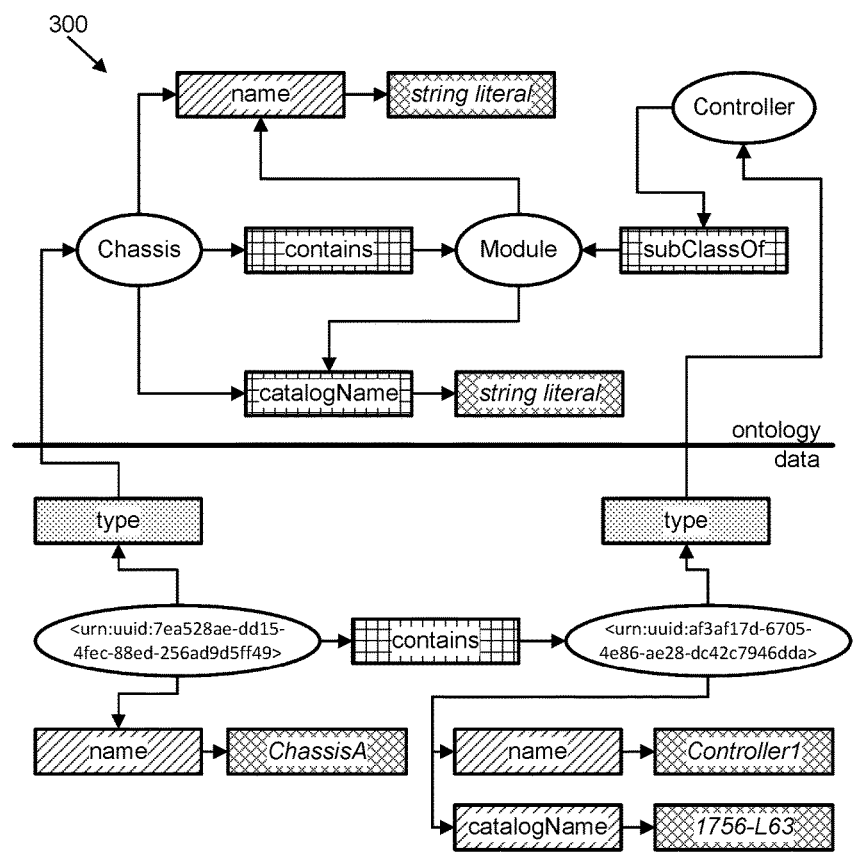
FIG. 3 is a schematic block diagram illustrating one embodiment of a semantic language graph for data exchange in a collaborative environment.

Various serialization formats may be available for serializing the semantic language formatted data. Some common serialization formats may include Turtle, N-Triples, N-Quads, JSON-LD, N3, RDF/XML, and/or the like. For example, FIG. 3 depicts one example of a graph 300 of data formatted using a web ontology, such as OWL, and structured data, such as RDF.

The ontological structure around the "controller" in Turtle/N3 format, for instance, may be as follows:

```
:name a owl:DatatypeProperty;
    rdfs:range xsd:string.
:Module rdf:type owl:Class ;
    rdfs:subClassOf [ rdf:type owl:Restriction ;
        owl:onProperty :name;
        owl:qualifiedCardinality "1"^^xsd:nonNegativeInteger ;
        owl:onDataRange xsd:string
    ] .
:Controller rdfs:subClassOf :Module.
```

An example of the corresponding structured data may be as follows:

```
<urn:uuid:7ea528ae-dd15-4fec-88ed-256ad9d5ff49>
    a :Chassis;
    :name "ChassisA";
    :contains <urn:uuid:af3af17d-6705-4e86-ae28-dc42c7946dda>.
<urn:uuid:af3af17d-6705-4e86-ae28-dc42c7946dda>.
    a :Controller;
    :name "Controller1";
    :catalogName "1756-L63".
```

The same ontology/data structure and data in RDF/XML format may be as follows:

```
<Chassis rdf:about="urn:uuid:7ea528ae-dd15-4fec-88ed-256ad9d5ff49">
    <name>ChassisA</name>
    <contains>
        <Controller rdf:about="urn:uuid:af3af17d-6705-4e86-ae28-
            dc42c7946dda">
            <name>Controller1</name>
            <catalogName>1756-L63</catalogName>
        </Controller>
    </contains>
</Chassis>
<rdf:Description rdf:about="&ra;Controller">
    <rdfs:subClassOf rdf:resource="&ra;Module"/>
</rdf:Description>
<owl:Class rdf:about="&ra;Module">
    <rdfs:subClassOf>
        <owl:Restriction>
            <owl:onProperty rdf:resource="&ra;name"/>
            <owl:qualifiedCardinality
                rdf:datatype="&xsd;nonNegativeInteger">1</owl:qualifiedCardinality>
            <owl:onDataRange rdf:resource="&xsd;string"/>
        </owl:Restriction>
    </rdfs:subClassOf>
</owl:Class>
<owl:DatatypeProperty rdf:about="&ra;name">
    <rdfs:range rdf:resource="&xsd;string"/>
</owl:DatatypeProperty>
```

Note that in the above examples, the format uses a uniform resource name ("URN") (e.g., "urn:uuid:7ea528ae-dd15-4fec-88ed-256ad9d5ff49"), otherwise known as a uniform resource identifier ("URI") to identify objects in an RDF resource. A URN may be a string of characters used to identify an object, resource, or the like. In some embodiments, the URN may be a globally unique identifier ("GUID") for an object. The data module 202, for example, may create, manage, or otherwise maintain GUIDs for various objects using a central authority, various GUID-generating algorithms, and/or the like.

As described in more detail below, if a GUID for an object or resource is not provided by an application/tool (e.g., such as a GUID for various objects or resources in a CAD project), a mapping may be generated and maintained for mapping an ID of a project/resource specific to an application to a GUID that uniquely distinguishes the object or resource from other objects or resources within a data set aggregated from multiple tools/resources.

Referring back to FIG. 2, the first set of data, therefore, may be an aggregation or combination of data that corresponds to projects of various applications that are used collaboratively to achieve a desired task in a semantic language format, such as an OWL/RDF format. For example, an OWL model of data associated with a Studio 5000® engineering project by Rockwell Automation® may include RDF structured data corresponding to data of projects associated with various different automation tools, CAD tools, modeling tools, or the like. As used herein, Studio 5000® is an application that combines engineering and design elements into one standard framework. Other Rockwell Automation® tools may be example applications used in the collaborative engineering environment includes RSLogix Architect®, RSLogix5000®, Integrated Architecture Builder, or the like.

After an OWL model of a project is created and maintained, the data module 202 may export the data of the OWL project to a file, multiple files, or the like; may make the data accessible over a network (e.g., via a query language such as SPARQL protocol and RDF query language ("SPARQL")); and/or may make the data accessible to multiple applications via a shared repository.

The data module 202, in certain embodiments, links multiple OWL/RDF models together. For example, if multiple applications maintain different OWL/RDF projects, the data module 202 may link the multiple different OWL/RDF projects together as if it is a single OWL/RDF project. The data module 202, in another embodiment, exports or imports subsets of an OWL/RDF project (e.g., as a result of a query). Furthermore, the data module 202 may extend or scale the OWL/RDF model definitions for a project in response to user input, input from an application, one or more characteristics of application data, and/or the like such that the OWL/RDF project corresponds to the data formats/types used by the various applications.

In one embodiment, the data module 202 accesses data from an application, or a service running on a device where the application is executing, using one or more application programming interface ("API") calls. In another embodiment, the data module 202 may access data for an application by importing one or more data files. In a further embodiment, described below, the data module 202 may receive data in response to one or more query statements, such as an SPARQL query statement. The data module 202 may receive the data over a network if it is stored on a remote device, or may receive the data over a local data bus if located on the same device as the application.

In one embodiment, at least a portion of the first set of data associated with the first application corresponds to a second set of data associated with a second application. For example, the first set of data may be data formatted using OWL/RDF such that at least a portion or subset of the first set of data corresponds to data of a logic application and at least a portion or subset of the first set of data corresponds to data of a CAD application. In such an embodiment, when the CAD application, for example, requests CAD data for the overall engineering project, the data module 202 may export only the portion or subset of the first set of data that corresponds to the CAD application.

In certain embodiments, the data module 202 receives data from an application in an application-specific format, such as a Studio 5000® format, a format for a specific CAD application, and/or the like. In such an embodiment, the data module 202 may send the received data to the conversion module 204, described below, which may convert the data to semantic language (OWL/RDF) structured format, and send the semantic language structured format to the data module 202 for export to a different application.

In certain embodiments, the first set of data has a format (e.g., an application specific form, an OWL/RDF format, or the like) that is readable by the first application, but is not readable by the second application. For example, Studio 5000® may be configured to read OWL/RDF formatted data (e.g., via a service executing on a device where Studio 5000® is running), while a separate CAD application may be configured to read data that is formatted for the CAD application and not formatted using OWL/RDF.

The conversion module 204, in one embodiment, converts the first data set from the semantic language format to an intermediate data set that has a format readable by a different application. As described above, the conversion module 204 may convert a data set that the data module 202 receives in a semantic language format to a format that is readable by an application that the data is being sent to. For example, the conversion module 204 may convert semantic language formatted data from a Studio 5000® application to an intermediate data set that is formatted to be read by a CAD application because the CAD application may not be configured to read data that is structured in a semantic language format.

In another embodiment, the conversion module 204 converts the first data set from an application-specific data format to a semantic language format. For example, the conversion module 204 may convert Studio 5000® project data to an OWL/RDF formatted data model, which may be used, as described below, to export to different applications, to convert to an application-specific format for distribution to a different application, to query for reading or updating the data, and/or the like.

The conversion module 204, in certain embodiments, maintains a mapping of data objects, resources, elements, or the like between different data sets associated with different applications. For example, Studio 5000® data may include data objects that have identifiers that are unique to Studio 5000®, but not necessarily to other applications, such as CAD data for a CAD tool, e.g., the mapping may ensure that data object A of a Studio 5000® data set corresponds to data object B of a CAD tool data set. Accordingly, to assure that data is formatted correctly between different applications, the conversion module 204 maintains a mapping of identifiers for objects between a first set of data and a second set of data. In certain embodiments, the conversion module 204 maintains a list, table, library, or the like of GUIDs for data objects within a data set such that each data object, regardless the application where the data is exported from, is assigned a GUID that is used during the data format conversion.

The synchronization module 206, in one embodiment, synchronizes the intermediate data created by the conversion module 204 with the second data of the second application (e.g., the application that is receiving the data) such that data changes that are made to the first data set by the first application are propagated to the second data set associated with the second application. In this manner, the second set of data may be synchronized with the first set of data such that data changes made by the first application to the first data set may be replicated in the second set of data. This may ensure that the second application is working with the most up-to-date set of data of the project that the data is associated with.

In one embodiment, the synchronization module 206 replicates new data in the first set of data to the second set of data. In some embodiments, the synchronization module 206 replicates modified data in the first set of data to the second set of data. In a further embodiment, the synchronization module 206 replicates data deletions in the first set of data to the second set of data. In certain embodiments, the synchronization module 206 only replicates data addition and/or modifications, while skipping data deletions. In certain embodiments, the synchronization module 206 performs a two-way synchronization such that changes made to the first set of data are replicated in the second set of data, and changes made to the second set of data are replicated in the first set of data.

In some embodiments, the synchronization module 206 provides a user interface that a user can interact with to manually resolve conflicts, select which data to synchronize, select with data to ignore, select one or more synchronization rules, select one or more conflict resolution rules, select various constraints, and/or the like.

The query module 208, in one embodiment, queries the first application, a service running on the first application, or the like, for access to at least a portion of the first data over a network 106. In some embodiments, the data module 202 uses the query module 208 to access and receive the first data over a network 106. The query module 208, in certain embodiments, uses a query language designed to access data in a semantic language format such as an OWL/RDF format. For example, the query module 208 may use the SPARQL query language to define one or more query statements to query the first application for the first set of data.

In such an embodiment, a query statement to retrieve all "controllers" with their corresponding names from the OWL/RDF formatted data described above with reference to FIG. 3 may be as follows:

```
SELECT * WHERE {
    GRAPH <file:///C:/path-to/rslaproject> {
        ?cntl a Controller;
            :name ?cntl_ name;
    } }
```

The query module 208 may also use query statements to update data in an OWL/RDF format. For example, a query statement to delete the controller "MyController1" from the data of a specified project may be as follows:

```
WITH <file:///C:/path-to/rslaproject>
DELETE { ?cntl ?p ?v. }
WHERE { ?cntl a Controller; name "MyController1".
    ?cntl ?p ?v. }
```

In certain embodiments, devices and/or applications that allow access to data using SPARQL are known as SPARQL endpoints. SPARQL endpoints may provide access to data over a network, such as the Internet, an Intranet, a LAN, a WAN, or the like over HTTP or securely over HTTPS, for example.

In some embodiments, when the query module 208 and/or the data module 202 receives a query for data of a project, such as a Studio 5000® project, the data module 204 may receive the Studio 5000® formatted data for the project, the conversion module 204 may convert the Studio 5000® formatted data to an OWL/RDF structured format/model, and the query module 208 may run the received query on the model. If the query is a query to receive data, the query module 208 runs the query on the OWL/RDF model and returns the results. However, if the query is an update query (e.g., to modify, add, or delete data in the project), the query is run on the model, which updates the underlying data in the project, and the conversion module 204 converts the updated project data to a new OWL/RDF model to be used in the next iteration. In this manner, data changes can be applied and reflected in the OWL/RDF formatted data model in real-time.

Figure 4:
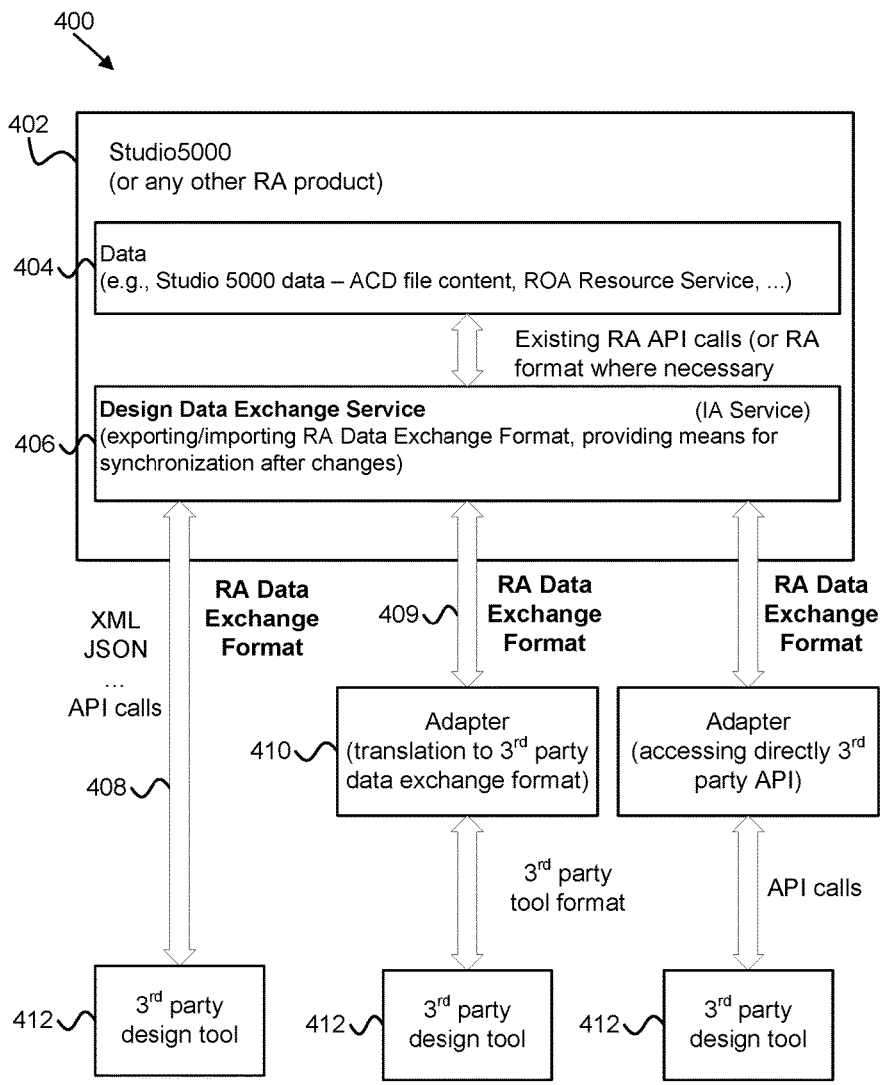
FIG. 4 is a schematic block diagram illustrating one embodiment of a system for data exchange in a collaborative environment.

In some embodiments, the data module 202, conversion module 204, synchronization module 206, and/or the query module 208 may be part of a service or "adapter" executing on a device where an application is executing, an external server communicatively connected to a device where an application is executing, and/or the like. As shown in FIG. 4, a first application—Studio 5000® 402, for example—may have data 404 that is formatted specifically for a Studio 5000® engineering project. The data module 202, in one embodiment, runs as part of a service 406, such as design data exchange service, and receives the data 404 from the Studio 5000® application 402. In certain embodiments, the data module 202 may receive the data in response to a request for at least a portion of the Studio 5000® data from a third party application 412. For example, a CAD tool may request CAD-related data associated with the Studio 5000® engineering project. In one embodiment, the data module 202 may use one or more application programming interfaces ("APIs") to access the Studio 5000® 402 data, may access one or more files for the data 404, may access a central repository where the data 404 is stored, or the like.

In a further embodiment, the conversion module 204, which may also run as part of a service 406, converts the received data to a semantic language format. For example, the conversion module 204 may convert the data to an OWL/RDF model, also known as a Rockwell Automation® data exchange format ("RADEF"). In one embodiment, if a third party application 412 is configured to read OWL/RDF formatted data, the data module 202 may send 408 the OWL/RDF data model directly to the third party application 412, e.g. as one or more files or in response to a SPARQL query. In another embodiment, the conversion module 206 converts the OWL/RDF data model to an XML/JSON formatted data, which the data module 202 sends 408 to the third party application 412, e.g., as one or more files. In a further embodiment, the third party application 412 accesses 408 the OWL/RDF data model, or other formatted data, directly from the service 406 and/or the application 402 using one or more API calls.

In some embodiments, at least a portion of the data module 202 and/or the conversion module 204 are embodied as an adapter 410 that receives 409 the OWL/RDF data model from the application 402, via a service 406, direct API calls, a SPARQL query, and/or the like. In certain embodiments, the conversion module 204 converts the OWL/RDF data model to a data format readable by the third party application 412. For example, the conversion module 204 may convert OWL/RDF data model that includes CAD-related data for a third party CAD application 412 to an intermediate data set that has a format that the third party CAD application can read and process. In such an embodiment, the conversion module 204 checks a list, table, library, database, or the like for mappings of data object identifiers in the OWL/RDF data format to data object identifiers in the third party application format (e.g., if GUIDs are not used)

to maintain the consistency and integrity of the data between the different applications 402, 412.

The data module 202, in one embodiment, sends the intermediate data set to the third party application 412 by exporting the intermediate data set as one or more files, by using API calls provided by the third party application 412, in response to a SPARQL query, and/or the like. After the third party application 412 processes the data, makes changes to the data, and/or the like, the changes may be propagated back to the Studio 5000® application 402. For example, the third party application 412 may send the modified data in the third party application format to the data module 202 on the adapter 410. The conversion module 204 may convert the third party application formatted data to an OWL/RDF model, using the data object identifier mappings, and the data module 202 may send the OWL/RDF formatted data to the service 406 executing with the Studio 5000® application 402.

The synchronization module 206 executing as part of the service 406 may synchronize the changes to the data made by the third party application 412 with the Studio 5000® project data so that the data sets between the Studio 5000® application 402 and the third party tool 412 are consistent. In certain embodiments, all or a portion of an adapter 410 may be located on a device where an application 402, 412 is executing, may be located on a remote server 108 or other device, and/or the like. For example, the conversion module 204 may be located on the device where Studio 5000® is executing and also on the device where the third party application 412 is executing, which may be the same or separate devices, while the synchronization module 206 is located on a central server 108 such that data synchronization, data mapping, and/or the like is isolated between the two applications 402, 412. In such an embodiment, the applications 402, 412 provide their converted RDF/OWL formatted data to the central server 108, e.g., to the data module 202, by exporting one or more files, by providing access via API calls, by providing access via a SPARQL query, and/or the like.

In a further embodiment, the conversion module 204 may also be located on an external server 108. In such an embodiment, the applications 402, 412 may provide their application-specific formatted data to a conversion module 204 located on a different device, which may convert the application-specific formatted data to an OWL/RDF data model, and vice versa. Alternatively, the data for each application may be stored in a central repository, such as a cloud server, where it can be accessed, converted, and synchronized in a single location. Thus, changes made to the data in each application 402, 412 would be propagated to the central repository, e.g., deletions may be marked, changes may be marked with a timestamp, or the like, and each application 402, 412 would receive updated data from the repository. In such an embodiment, the data module 202 may perform various actions on the data, such as version history, data analytics, and/or the like.

Figure 5:
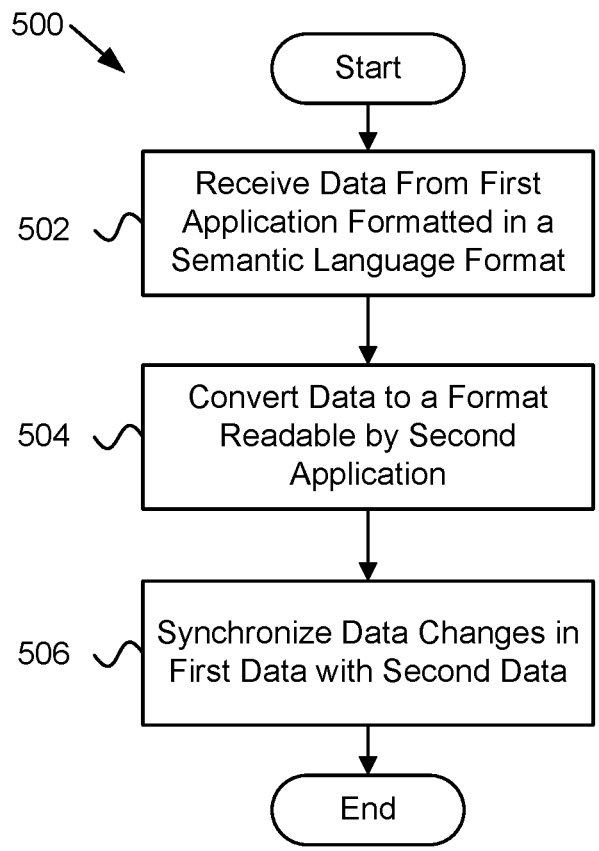
FIG. 5 is a schematic flow chart diagram illustrating one embodiment of a method for data exchange in a collaborative environment.

FIG. 5 is a schematic flow-chart diagram of one embodiment of a method 500 for data exchange in a collaborative environment. The method 500 begins and receives 502 a first data set from a first application. The first data set corresponds to a second data set of a second application. The first data set has a structured format that is readable by the first application. In some embodiments, the structured format includes a semantic language format.

The method 500 converts 504 the first data from the semantic language format to an intermediate data set that has a format readable by the second application. The method 500 synchronizes 506 the intermediate data set with the second data set such that changes made to the first data set by the first application are replicated in the second data set of the second application, and the method 500 ends. In some embodiments, the data module 202, the conversion module 204, and the synchronization module 206 perform the various steps of the method 500.

Figure 6:
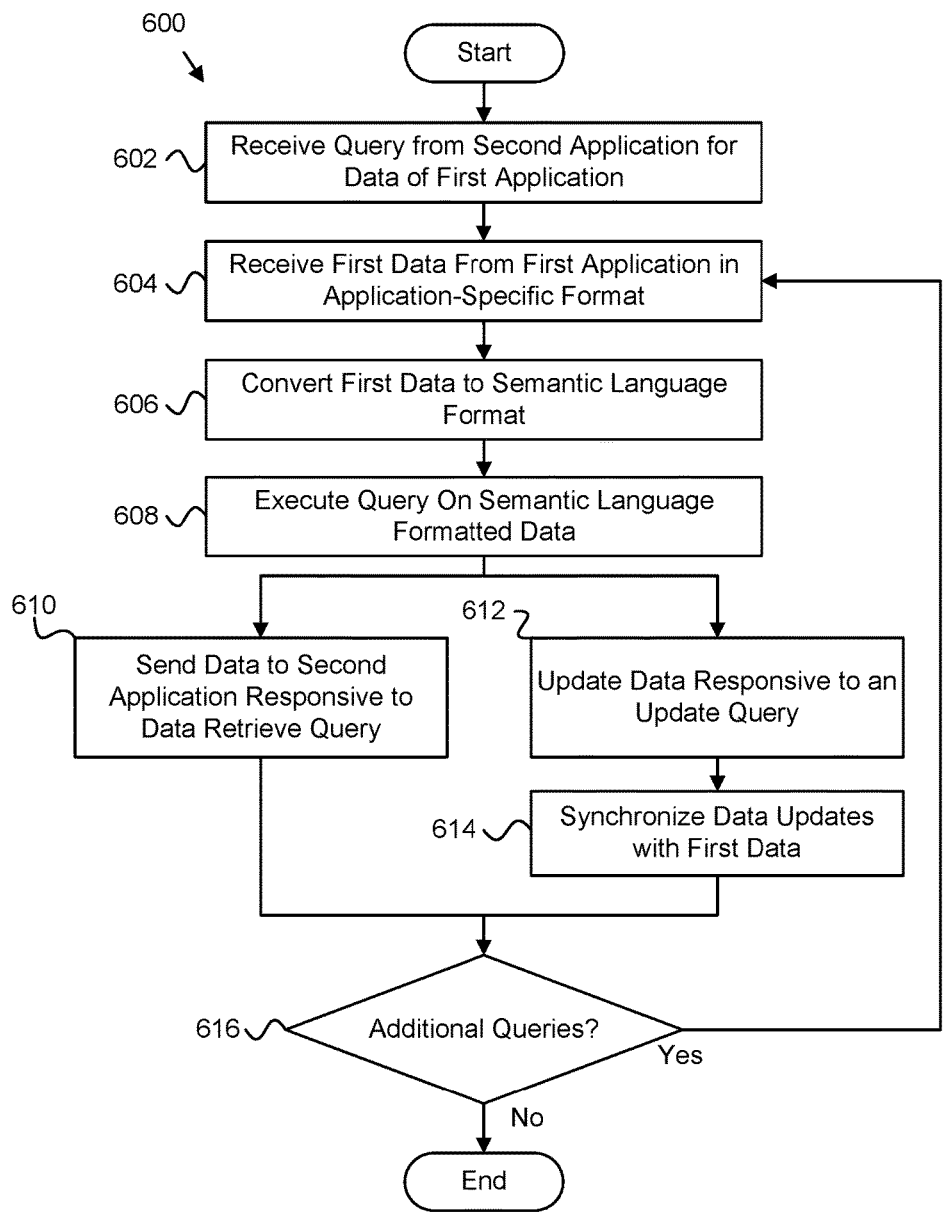
FIG. 6 is a schematic flow chart diagram illustrating one embodiment of another method for data exchange in a collaborative environment.

FIG. 6 is a schematic flow-chart diagram of one embodiment of a method 600 for data exchange in a collaborative environment. The method 600 begins, and receives 602 a query from a second application for data of a first application. The query, for example, may be a SPARQL query statement to access data, update data, and/or the like associated with the first application. The method 600 receives 604 first data from a first application in an application-specific format. For example, the first data may be formatted such that it can only be read by the first application.

The method 600 converts 606 the first data to a data set that has a semantic language data format, such as an OWL/RDF structured data model. The method 600 executes 608 the query on the semantically structured data set. In some embodiments, the method 600 sends 610 data to the second application responsive to the query being a query to retrieve, access, or read data from the semantically formatted data set.

The method 600 updates 612 the semantically formatted data in response to an update query from the second application. The method 600 synchronizes 614 the data updates with the first data of the first application, e.g., the application-specific formatted data. The method 600 determines 616 whether there are additional queries to be executed on the semantically formatted data. If so, the method 600 recreates the semantic language data model of the first data by receiving 604 the first data in the application-specific format again and converting 606 it to a semantic language format, and so on. Otherwise, the method 600 ends. In some embodiments, the data module 202, the conversion module 204, the synchronization module 206, and the query module 208 perform the various steps of the method 600.

The described examples and embodiments are to be considered in all respects only as illustrative and not restrictive. This written description uses examples and embodiments to disclose the invention, including best mode, and also to enable any person skilled in the art to practice the invention, including making and using any devices or systems and performing any incorporated methods. The examples and embodiments may be practiced in other specific forms. The patentable scope of this invention is defined by the claims and may include other examples that occur to those skilled in the art. Such other examples are intended to be within the claims if they have structural elements that do not differ from the literal language of the claims, or if they include equivalent structural element with insubstantial differences from the literal languages of the claims.

What is claimed is:

1. An apparatus comprising:
   a data module that:
   receives first data from a first application, the first data representing a project in the first application and corresponding to second data representing a project of a second application, the first data having a structured format readable by the first application, but not readable by the second application, the structured format comprising a semantic language format; and
   combines the first data representing the project in the first application in the semantic language format with one or more other data sets representing different projects for applications different from the first application that are formatted using the semantic language format so that the first data and the other data sets comprise a single project structure representing the plurality of different projects;

a conversion module that:

maintains a mapping of identifiers for one or more data objects of the first data to identifiers for one or more corresponding data objects of the second data so that data changes made to the data objects of the first data by the first application are propagated to the corresponding data objects of the second data and data changes made to the data objects of the second data by the second application are propagated to the corresponding data objects of the first data; and converts, in response to a request from the second application, at least a subset of the data of the single project structure representing the first data from the semantic language format to an intermediate data having a format readable by the second application using the mapping of data object identifiers; and a synchronization module that synchronizes changes that are made to the intermediate data by the second application with the first data of the single project structure that corresponds to the intermediate data using the mapping of data object identifiers to identify the corresponding data objects of the first data, wherein at least a portion of the said modules comprises one or more of hardware and executable code, the executable code stored on one or more computer readable storage media.

2. The apparatus of claim 1, wherein:

the data module further:

receives the second data representing the project of the second application from the second application, the second data corresponding to first data representing the project of the first application, the second data having a format readable by the second application, but not readable by the first application; and adds the second data representing the project of the second application to the single project structure representing the plurality of different projects;

the conversion module further converts at least a subset of the single project structure representing the second data from the format readable by the second application to an intermediate data having a semantic language format readable by the first application; and the synchronization module further synchronizes the intermediate data with the first data, wherein changes made to the intermediate data by the first application are replicated in the second data of the second application.

3. The apparatus of claim 1, wherein the semantic language format readable by the first application comprises a data format intended for data transmissions on the world wide web over the Internet.

4. The apparatus of claim 3, wherein the semantic language format is based on one or more of a resource description framework ("RDF") and a web ontology language ("OWL").

5. The apparatus of claim 1, wherein the data module exports the first data as one or more files that are formatted according to the semantic language format, the conversion module reading the one or more files to convert the first data to the intermediate data, the single project structure comprising a repository of files representing different projects for different applications.

6. The apparatus of claim 1, wherein the data module accesses the first data from the first application using one or more application programming interfaces ("APIs") provided by the first application.

7. The apparatus of claim 1, further comprising a query module that queries the first application for access to at least a portion of the first data formatted in the semantic language format.

8. The apparatus of claim 7, wherein the query module uses a semantic query language to define one or more query statements to query the first application for the at least a portion of the first data.

9. The apparatus of claim 8, wherein the semantic query language is a SPARQL protocol and RDF query language ("SPARQL").

10. The apparatus of claim 7, wherein the query module queries the first application for access to at least a portion of the first data over a network.

11. The apparatus of claim 1, wherein the first data and the second data are stored in a central repository, the central repository accessible to the first application and the second application, the central repository comprising a remote cloud repository.

12. The apparatus of claim 11, wherein the synchronization module is located at the central repository such that synchronization operations between the first data and the second data are performed on the central repository.

13. The apparatus of claim 1, wherein the first data comprises an aggregation of data from a plurality of different applications, the plurality of different applications comprising a plurality of engineering design tools.

14. A method comprising:

receiving first data from a first application, the first data representing a project in the first application and corresponding to second data representing a project of a second application, the first data having a structured format readable by the first application, but not readable by the second application, the structured format comprising a semantic language format;

combining the first data representing the project in the first application in the semantic language format with one or more other data sets representing different projects for applications different from the first application that are formatted using the semantic language format so that the first data and the other data sets comprise a single project structure representing the plurality of different projects;

maintaining a mapping of identifiers for one or more data objects of the first data to identifiers for one or more corresponding data objects of the second data so that data changes made to the data objects of the first data by the first application are propagated to the corresponding data objects of the second data and data changes made to the data objects of the second data by the second application are propagated to the corresponding data objects of the first data;

converting, in response to a request from the second application, at least a subset of the data of the single project structure representing the first data from the semantic language format to an intermediate data having a format readable by the second application, using the mapping of data object identifiers; and synchronizing changes that are made to the intermediate data by the second application with the first data of the single project structure that corresponds to the intermediate data using the mapping of data object identifiers to identify the corresponding data objects of the first data.

15. The method of claim 14, further comprising:

receiving the second data representing the project of the second application from the second application, the second data corresponding to first data representing the project of the first application, the second data having a format readable by the second application, but not readable by the first application;

adding the second data representing the project of the second application to the single project structure representing the plurality of different projects converting at least a subset of the single project structure representing the second data from the format readable by the second application to an intermediate data having a semantic language format readable by the first application; and synchronizing the intermediate data with the first data wherein changes made to the second data by the second application are replicated in the first data of the first application.

16. The method of claim 14, wherein the semantic language format readable by the first application comprises a data format intended for data transmissions on the world wide web over the Internet, the semantic language format based on one or more of a resource description framework ("RDF") and a web ontology language ("OWL").

17. The method of claim 14, further comprising accessing the first data from the first application using one or more application programming interfaces ("APIs") provided by the first application.

18. The method of claim 14, further comprising querying the first application for access to at least a portion of the first data formatted in the semantic language format, wherein a semantic query language is used to define one or more query statements to query the first application for the at least a portion of the first data, the semantic query language comprising a SPARQL protocol and RDF query language ("SPARQL").

19. A computer program product comprising a computer readable storage medium having program code embodied therein, the program code readable/executable by a processor to:

receive first data from a first application, the first data representing a project in the first application and corresponding to second data representing a project of a second application, the first data having a structured format readable by the first application, but not readable by the second application, the structured format comprising a semantic language format;

combine the first data representing the project in the first application in the semantic language format with one or more other data sets representing different projects for applications different from the first application that are formatted using the semantic language format so that the first data and the other data sets comprise a single project structure representing the plurality of different projects;

maintain a mapping of identifiers for one or more data objects of the first data to identifiers for one or more corresponding data objects of the second data so that data changes made to the data objects of the first data by the first application are propagated to the corresponding data objects of the second data and data changes made to the data objects of the second data by the second application are propagated to the corresponding data objects of the first data;

convert, in response to a request from the second application, at least a subset of the data of the single project structure representing the first data from the semantic language format to an intermediate data having a format readable by the second application using the mapping of data object identifiers; and synchronize changes that are made to the intermediate data by the second application with the first data of the single project structure that corresponds to the intermediate data using the mapping of data object identifiers to identify the corresponding data objects of the first data.

* * * * *